US008829368B2

(12) United States Patent
Hinata

(10) Patent No.: US 8,829,368 B2
(45) Date of Patent: Sep. 9, 2014

(54) RESISTIVE FILM TYPE INPUT DEVICE, DISPLAY DEVICE WITH INPUT FUNCTION, AND ELECTRONIC APPARATUS

(75) Inventor: Shoji Hinata, Matsumoto (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 443 days.

(21) Appl. No.: 12/487,027

(22) Filed: Jun. 18, 2009

(65) Prior Publication Data

US 2010/0059293 A1 Mar. 11, 2010

(30) Foreign Application Priority Data

Sep. 10, 2008 (JP) ................................. 2008-231849

(51) Int. Cl.
*G06F 3/045* (2006.01)
(52) U.S. Cl.
CPC ...................................... *G06F 3/045* (2013.01)
USPC ........................................ 178/18.05; 345/174
(58) Field of Classification Search
USPC ..................... 345/173–174; 178/18.01–18.11
See application file for complete search history.

(56) References Cited

U.S. PATENT DOCUMENTS

| 4,087,625 | A | | 5/1978 | Dym et al. |
| 4,602,126 | A | * | 7/1986 | Hiraishi ..................... 178/18.05 |
| 4,745,242 | A | * | 5/1988 | Koizumi et al. ........... 178/18.05 |
| 5,335,230 | A | * | 8/1994 | Crooks et al. ................... 714/48 |
| 5,412,161 | A | * | 5/1995 | Crooks et al. ............. 178/18.02 |
| 5,496,974 | A | | 3/1996 | Akebi et al. |
| 5,834,709 | A | * | 11/1998 | Blonder et al. ............ 178/18.05 |
| 6,285,417 | B1 | * | 9/2001 | Ahn et al. ........................ 349/23 |
| 6,690,361 | B1 | | 2/2004 | Kang et al. |
| 7,348,966 | B2 | * | 3/2008 | Hong et al. ..................... 345/173 |
| 7,492,358 | B2 | * | 2/2009 | Chi et al. ....................... 345/173 |
| 2005/0275634 | A1 | | 12/2005 | Chi et al. |
| 2007/0247443 | A1 | * | 10/2007 | Philipp .......................... 345/173 |
| 2008/0296073 | A1 | * | 12/2008 | McDermid ................ 178/18.05 |

FOREIGN PATENT DOCUMENTS

| JP | 53-084420 | 7/1978 |
| JP | 60-075923 | 4/1985 |
| JP | 63-252329 | 10/1988 |
| JP | 07-120238 | 12/1995 |
| JP | 2955149 | 7/1999 |
| JP | 2001-034419 | 2/2001 |
| JP | 2001-043002 | 2/2001 |
| JP | 2001-184160 | 7/2001 |
| JP | 2001-0249766 | 9/2001 |
| JP | 2004-139144 | 5/2004 |
| JP | 2004-252739 | 9/2004 |
| JP | 2006-039667 | 2/2006 |
| JP | 2007-299409 | 11/2007 |
| JP | 2008-269297 | 11/2008 |

OTHER PUBLICATIONS

Taiwan Office Action issued Jun. 10, 2013 in corresponding Taiwan Patent Application No. 098126038.

* cited by examiner

*Primary Examiner* — Jimmy H Nguyen
(74) *Attorney, Agent, or Firm* — K&L Gates LLP

(57) ABSTRACT

A resistive film type input device includes: a resistive film which is formed on a surface of the first insulating substrate opposed to the second insulating substrate; feeding electrodes which apply a voltage to the resistive film on the first insulating substrate; a detecting electrode films which are formed on a surface of the second insulating substrate are in an electrically floating state; and a potential detecting unit which detects a potential of a contact location of the resistive film through the detecting electrode film contacted to the resistive film among the detecting electrode films by pressing against.

4 Claims, 10 Drawing Sheets

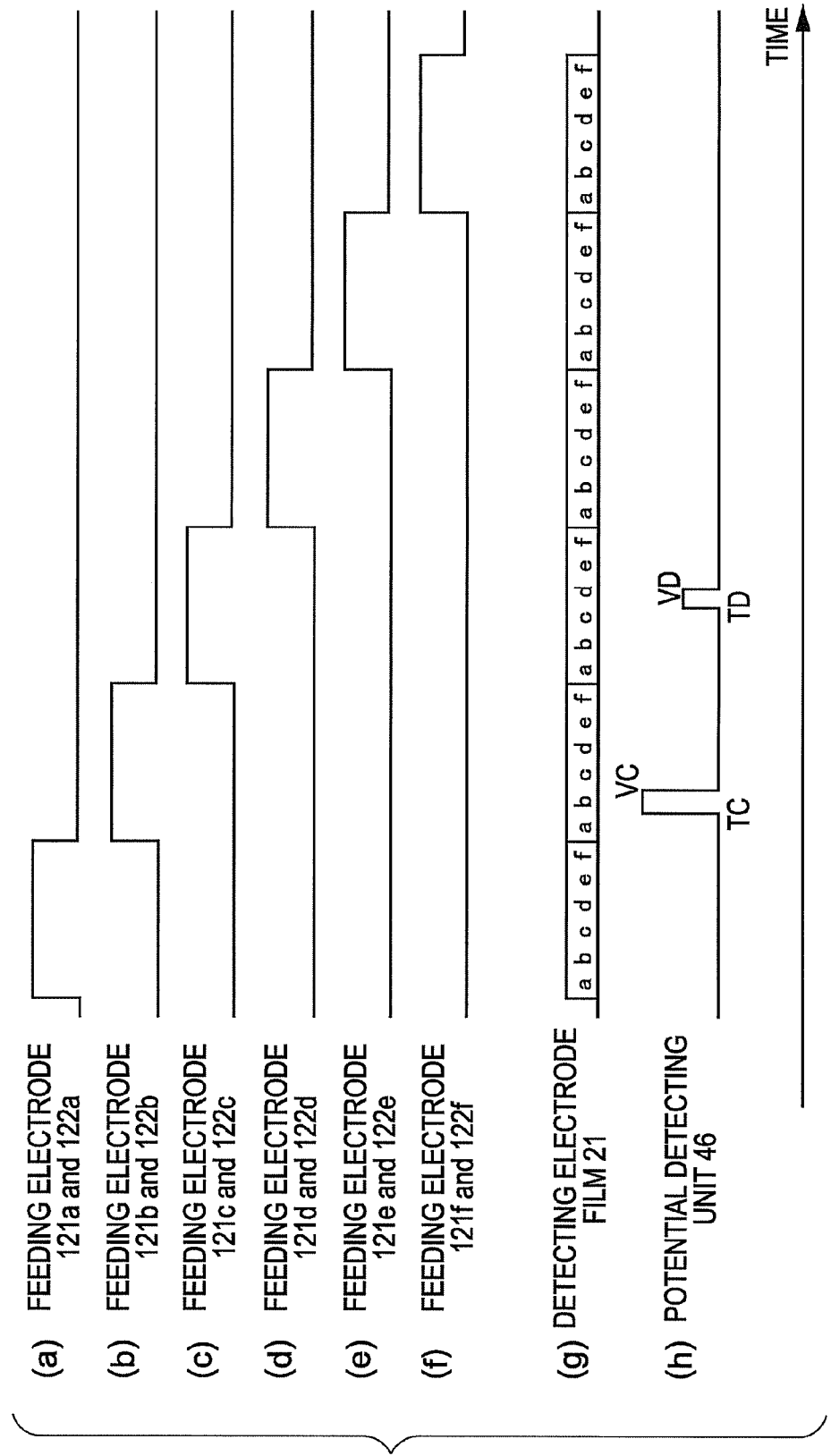

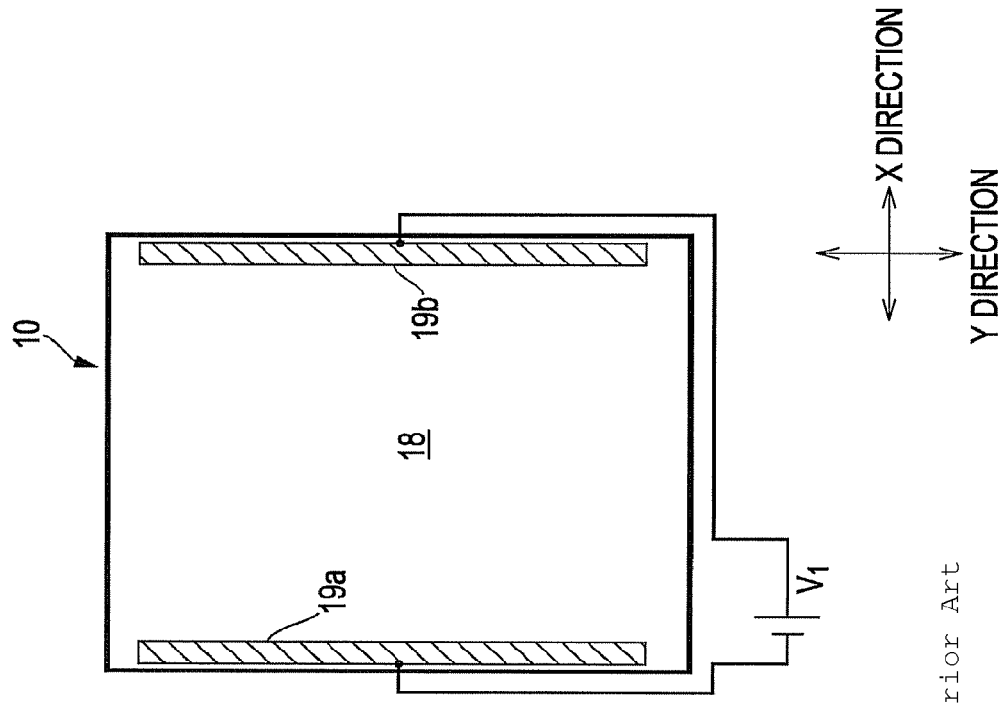
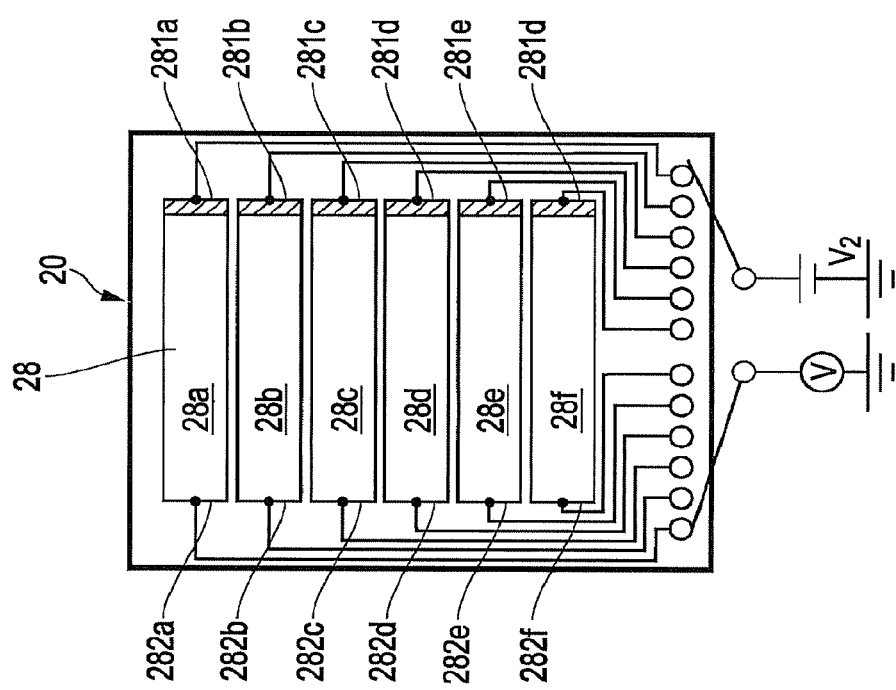

RESISTIVE FILM TYPE INPUT DEVICE, DISPLAY DEVICE WITH INPUT FUNCTION, AND ELECTRONIC APPARATUS

BACKGROUND

1. Technical Field

The present invention relates to a resistive film type input device which is capable of detecting one or a plurality of locations touched by a finger, a pen, or the like, a display device with an input function which includes the resistive film type input device, and an electronic apparatus which includes the display device with the input function.

2. Related Art

As an electronic apparatus such as a cellular phone, a car navigation, a personal computer, a ticket vending machine, or a bank terminal, recently, there has been known an electronic apparatus in which an input device called a touch panel is disposed on the surface of a liquid crystal device and information is input with reference to an image displayed on an image display area of the liquid crystal device. In a resistive film type input device among the input devices, a first planar resistive film 16 and a second planar resistive film 26 are generally formed on the surfaces of a first insulating substrate 10 and a second insulating substrate 20 opposed to each other, respectively, as shown in FIG. 9A. With such a configuration, when the second insulating substrate 20 is pressed down at a predetermined location, the first planar resistive film 16 and the second planar resistive film 26 partially come in contact with each other. Therefore, when a voltage in a Y direction is applied to the first planar resistive film 16 through first strip-shaped feeding electrodes 17a and 17b and a potential Vsy is detected through the second planar resistive film 26, the contact location in the Y direction can be detected. When a voltage in an X direction is applied to the second planar resistive film 26 through second strip-shaped feeding electrodes 27a and 27b and a potential Vsx is detected through the first planar resistive film 16, as shown in FIG. 9B, the contact location in the X direction can be detected.

This resistive film type input device has an advantage in that information can be input with a pen differently from a capacitance type input device. However, this resistive film type input device has a defect in that exact detection cannot be achieved. That is because when two locations are simultaneously pressed down, resistances from the contact locations are combined to each other and detected.

In order to solve this defect, as shown in FIGS. 10A and 10B, there was suggested a resistive film type input device in which a planar resistive film 18 and strip-shaped feeding electrodes 19a and 19b which apply a voltage to both the ends in an X direction of the planar resistive film 18 are formed in a first insulating substrate 10 and a plurality of strip-shaped resistive films 28a, 28b, . . . , and 28f extending in the X direction are arranged in parallel in an Y direction in a second insulating substrate 20 (see JP-A-2001-34419).

In this resistive film type input device, when a voltage $V_1$ is applied to the planar resistive film 18 through the feeding electrodes 19a and 19b and a constant potential $V_2$ is sequentially applied to one end portions 281a, 281b, . . . , and 281f of the plurality of strip-shaped resistive films 28a, 28b, . . . , and 28f, the potentials of the other end portions 282a, 282b, . . . , and 282f of the plurality of strip-shaped resistive films 28a, 28b, . . . , and 28f are sequentially detected. In this resistive film type input device, when the first insulating substrate 10 or the second insulating substrate 20 is pressed down and the planar resistive film 18 comes in contact with the strip-shaped resistive films 28a, 28b, . . . , and 28f, the contact locations cause a variation in resistant values of contact locations contacted to the other end portions 282a, 282b, . . . , and 282f of the strip-shaped resistive films 28a, 28b, . . . , and 28f. Accordingly, since the potentials detected from the other end portions 282a, 282b, . . . , and 282f of the plurality of strip-shaped resistive films 28a, 28b, . . . , and 28f vary, the positions in the X direction of the contact locations can be detected. Moreover, the plurality of strip-shaped resistive films 28a, 28b, . . . , and 28f are arranged in parallel in the Y direction, the positions in the Y direction of the contact locations can be detected. Even when the first insulating substrate 10 or the second insulating substrate 20 is simultaneously pressed at two different locations in the Y direction, it is possible to specify the two pressed locations.

However, a resistance deviation easily occurs since the resistive film is formed of an ITO film or the like having a thin thickness. Accordingly, in the configuration disclosed in JP-A-2001-34419, it is necessary to form resistive films in both the first insulating substrate 10 and the second insulating substrate 20. For this reason, a problem occurs in that detection precision deterioration caused due to the resistance deviation of the resistive films easily occurs. Moreover, in the configuration disclosed in JP-A-2001-34419, since the resistance values of the strip-shaped resistive films 28a, 28b, . . . , and 28f are required to be larger than that of the planar resistive film 18 by one or two digits, it is necessary for the film thickness of the respective strip-shaped resistive films 28a, 28b, . . . , and 28f to be considerably thin. Accordingly, since the resistance deviation easily occurs in the strip-shaped resistive films 28a, 28b, . . . , and 28f, a problem occurs in that the detection precision deterioration easily occurs. Moreover, in the configuration disclosed in JP-A-2001-34419, the voltage is applied to the strip-shaped resistive films 28a, 28b, . . . , and 28f of the second insulating substrate 20 as well as the planar resistive film 18 of the first insulating substrate 10 and the potential is also detected on the side of the second insulating substrate 20. Accordingly, a problem occurs in that the configuration is complicated.

SUMMARY

An advantage of some aspects of the invention is that it provides a resistive film type input device which is capable of specifying plural locations simultaneously pressed by generating a potential gradient in a resistive film only in one of a pair of substrates, a display device with an input function which includes the resistive film type input device, and an electronic apparatus which includes the display device with the input function.

According to an aspect of the invention, there is provided a resistive film type input device including: a first insulating substrate; a second insulating substrate which is disposed opposite the first insulating substrate with a gap interposed therebetween; a resistive film which is formed on a surface of the first insulating substrate opposed to the second insulating substrate; feeding electrodes which apply a voltage to both end portions of the resistive film on the first insulating substrate; a plurality of detecting electrode films which are formed on a surface of the second insulating substrate opposed to the first insulating substrate and are in an electrically floating state; and a potential detecting unit which detects a potential of a contact location of the resistive film through the detecting electrode film in contact with the resistive film among the plurality of detecting electrode films by pressing against the first insulating substrate or the second insulating substrate.

According to this aspect of the invention, the resistive film is formed on the first insulating substrate and potential gradients are formed by applying the voltage to both end portions of the resistive film through the feeding electrodes formed on the first insulating substrate. On the other hand, the plurality of detecting electrode films in the floating state are formed on the second insulating substrate and the potential detecting unit detects the potentials of the plurality of detecting electrode films. With such a configuration, when one of the plurality of detecting electrode films comes in contact with the resistive film by pressing against the first insulating substrate or the second insulating substrate, the potential detecting unit can detect the potential of the resistive film at the contact location through the detecting electrode film contacted to the resistive film. Accordingly, it is possible to specify the pressed location against the first insulating substrate or the second insulating substrate. Here, the plurality of detecting electrode films are provided. Therefore, even when the first insulating substrate or the second insulating substrate is pressed at a plurality of locations, the potential detecting unit can specify each of the plurality of simultaneously pressed locations as long as the pressed locations are locations corresponding to the different detecting electrode films. According to this aspect of the invention, since the potential gradient is generated in the resistive film only in the first insulating substrate, it is necessary to form the resistive film on the first insulating substrate. However, the sheet resistance of the detecting electrode film formed on the second insulating substrate is not required to be high. Therefore, since the resistive film in which a resistance deviation easily occurs is formed only on the first insulating substrate, a detection error caused due to the resistance deviation of the resistive film rarely occurs. Accordingly, it is possible to surely specify the positions of each of the plurality of simultaneously pressed locations.

In the resistive film type input device according to this aspect of the invention, the resistive film may be a planar resistive film which is formed in an X direction and a Y direction intersecting the X direction on the surface of the first insulating substrate. In addition, the feeding electrode may include a first feeding electrode which applies a voltage to both end portions in the X direction of the resistive film and a second feeding electrode which applies a voltage to both end portions in the Y direction of the resistive film at time different from that of the first feeding electrode. With such a configuration, just by allowing the time of applying the voltage to the first feeding electrode to be different from the time of applying the voltage to the second feeding electrode, it is possible to specify the positions in the X and Y directions of each of the plurality of simultaneously pressed locations.

In the resistive film type input device according to this aspect of the invention, the plurality of detecting electrode films may be formed such that a plurality of strip-shaped electrodes extending in one direction of the X and Y directions are arranged in parallel in the other direction of the X and Y directions.

In the resistive film type input device according to this aspect of the invention, the resistive film may be formed such that a plurality of strip-shaped resistive films extending in one direction of an X direction and a Y direction intersecting the X direction on the surface of the first insulating substrate are arranged in parallel in the other direction of the X and Y directions. In this case, the plurality of detecting electrode films may be formed such that a plurality of strip-shaped electrodes extending in the other direction are arranged in parallel in the one direction. In addition, the feeding electrodes may be formed as plural pairs of electrodes connected to both end portions in the one direction of the plurality of strip-shaped resistive films. Among the plurality of strip-shaped resistive films, the strip-shaped resistive films of which both the end portions in the X direction may be applied with the voltage are switched in time-series in the other direction.

In the resistive film type input device according to this aspect of the invention, the plurality of detecting electrode films may be partitioned into two groups in the extending direction of the detecting electrode films, when the plurality of detecting electrode films extend in the strip shape.

In this case, the plurality of detecting electrode films may be partitioned into the two groups by slits extending in a direction intersecting both the X and Y directions.

In the resistive film type input device according to this aspect of the invention, among the plurality of detecting electrode films, the detecting electrode films of which the potential may be detected by the potential detecting unit are switched in time-series.

In the resistive film type input device according to this aspect of the invention, the first insulating substrate, the second insulating substrate, and the resistive film, and the detecting electrode films may all have a light-transmitting property.

According to another aspect of the invention, there is provided a display device with an input function which includes the resistive film type input device according to the above aspect of the invention. In this case, an image forming device is disposed to overlap on an opposite side of the second insulating substrate with respect to the first insulating substrate.

According to still another aspect of the invention, there is provided an electronic apparatus such as a cellular phone, a car navigation, a personal computer, a ticket-vending machine, or a bank terminal including the display device with the input function according to the above aspect of the invention.

BRIEF DESCRIPTION OF THE DRAWINGS

The invention will be described with reference to the accompanying drawings, wherein like numbers reference like elements.

FIG. 7 is a timing chart illustrating an operation of the resistive film type input device according to the fourth embodiment of the invention.

FIGS. 10A and 10B are explanatory diagrams schematically illustrating the configuration of a first insulating substrate and schematically illustrating the configuration of the second insulating substrate in another known resistive film type input device.

DESCRIPTION OF EXEMPLARY EMBODIMENTS

Figure 1A:
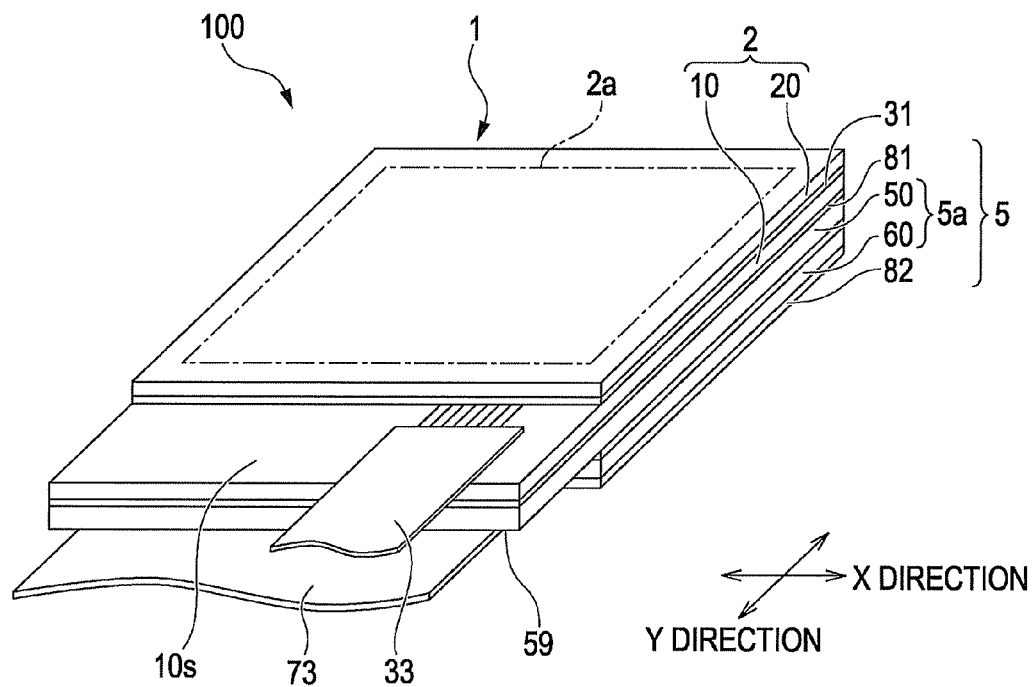
FIGS. 1A and 1B are explanatory diagrams schematically illustrating the overall configuration of a display device with an input function and schematically illustrating the configuration of the cross-section of the display device according to the invention.

Embodiment of the invention will be described with reference to the drawings. In the drawings referred in the following description, respective layers and respective constituent elements are appropriately shown with different scales and in different numbers in order to permit the layers and constituent elements to be recognizable in the drawings. In addition, in the following description, the same reference numerals are given to the constituent elements having a function common to the constituent elements described with reference to FIGS. 9A and 9B and FIGS. 10A and 10B in order to easily know a correspondent relation.

First Embodiment

Overall Configuration

Figure 1B:
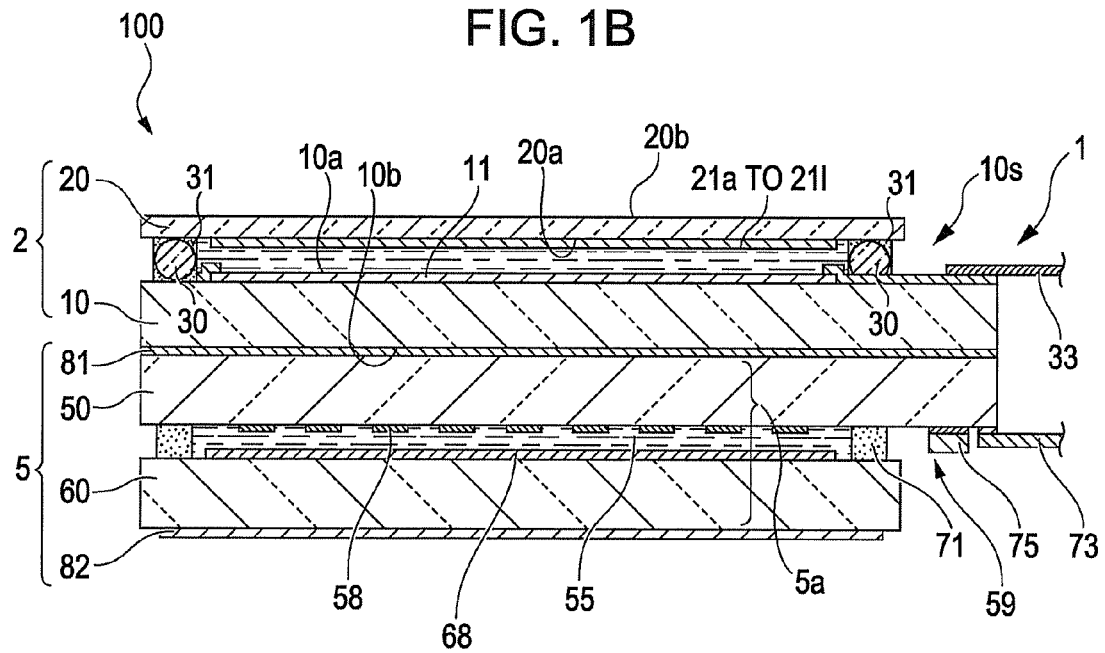

FIGS. 1A and 1B are explanatory diagrams schematically illustrating the overall configuration of a display device with an input function and schematically illustrating the configuration of the cross-section of the display device according to the invention, respectively. In FIG. 1B, electrodes of an input device and pixel electrodes, counter electrodes, and the like of a liquid crystal device are shown simply in the numbers and the like.

In FIGS. 1A and 1B, a display device 100 with an input function according to this embodiment includes a liquid crystal device 5 as an image forming device and a resistive film type input device 1 which is disposed to overlap on the surface of the liquid crystal device 5 from which display light is emitted. The liquid crystal device 5 includes a transmissive, reflective, or transflective active matrix type liquid crystal panel 5a. In this embodiment, since the liquid crystal panel 5a is transmissive, a backlight unit (now shown) is disposed to be opposite to the side of emitting the display light. In the liquid crystal device 5, a first polarizing plate 81 is disposed to overlap on the side of emitting the display light with respect to the liquid crystal panel 5a and a second polarizing plate 82 is disposed to overlap on an opposite side of emitting the display light. The liquid crystal panel 5a includes a transmissive element substrate 50 disposed on the side of emitting the display light and a transmissive counter substrate 60 disposed opposite the element substrate 50. The element substrate 50 and the counter substrate 60 are attached to each other by a sealing member 71 having a frame shape. Between the element substrate 50 and the counter substrate 60, a liquid crystal layer 55 is formed within the area surrounded by the sealing member 71.

In the element substrate 50, a plurality of pixel electrodes 58 are formed on the surface opposed to the counter substrate 60. In the counter substrate 60, a common electrode 68 is formed on the surface opposed to the element substrate 50. Alternatively, the common electrode 68 may be formed on the element substrate 50. Moreover, the counter substrate 60 may be disposed on the side of emitting the display light. On the element substrate 50, a driving IC 75 is COG-mounted in an extended area 59 extended from the edge of the counter substrate 60, and a flexible substrate 73 is connected to the extended area 59. In addition, switching elements formed on the element substrate 50 and a driving circuit may be formed together on the element substrate 50.

The resistive film type input device 1 includes a resistive film type input panel 2 disposed to overlap with the liquid crystal device 5. The middle area of the resistive film type input panel 2 is used as an input area 2a. The resistive film type input panel 2 includes a first insulating substrate 10 formed of a glass plate, a plastic plate, or the like and having a light-transmitting property and a second insulating substrate 20 formed of a glass plate, a plastic plate, a plastic sheet, or the like and having a light-transmitting property. In this embodiment, both the first insulating substrate 10 and the second insulating substrate 20 are formed of the glass plate. The first insulating substrate 10 and the second insulating substrate 20 are attached to each other by a sealing member 31 having a frame shape so that first surfaces 10a and 20a are opposed to each other with a predetermined gap interposed therebetween. In addition, when the predetermined gap is interposed between the first insulating substrate 10 and the second insulating substrate 20, a space may be interposed between the first insulating substrate 10 and the second insulating substrate 20.

In this embodiment, the second insulating substrate 20 is disposed on a side of an input operation and the first insulating substrate 10 is disposed on a side of the liquid crystal device 5. With such a configuration, a second surface 20b of the second insulating substrate 20 faces the side of the input operation and a second surface 10b of the first insulating substrate 10 faces the side of the liquid crystal device 5. In the resistive film type input panel 2 having such a configuration, when an input operation is carried out, the second insulating substrate 20 is required to be bent. Therefore, the second insulating substrate 20 is thinner than the first insulating substrate 10 and has a flexible property. Both the first insulating substrate 10 and the second insulating substrate 20 have a rectangular shape of which sides extend in X and Y directions.

On the first surface 10a of the first insulating substrate 10, a flexible substrate 33 is connected to an extended area 10s extended from the edge of the second insulating substrate 20 in the Y direction. The flexible substrate 33 is a wiring member which electrically connects the resistive film type input panel 2 to an input location detecting unit (not shown) or the like. A flexible substrate or the like is not connected to the second insulating substrate 20. However, when conductive particles are mixed into the sealing member 31 having the frame shape, electric connection between the first insulating substrate 10 and the second insulating substrate 20 is possible. With such a configuration, electricity feeding or signal exchange between the first insulating substrate 10 and the second insulating substrate 20 is possible.

Detailed Configuration of Resistive Film Type Input Device 1

Figure 2:
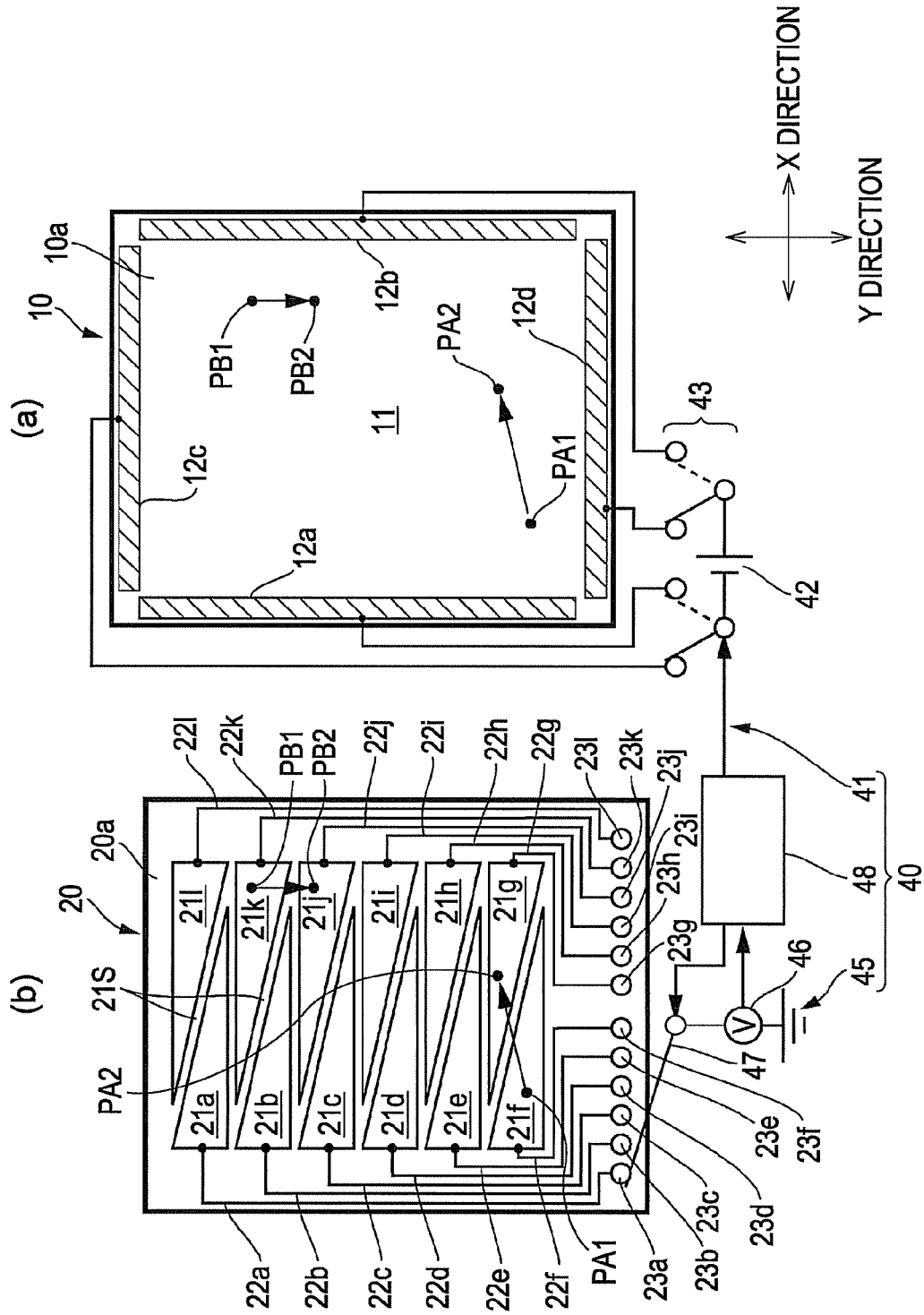
FIG. 2 is an explanatory diagram schematically illustrating the configuration of a first insulating substrate and the configuration of a second insulating substrate in a resistive film type input device of the display device with the input function according to a first embodiment of the invention.

FIG. 2 is an explanatory diagram schematically illustrating the configuration of the first insulating substrate and the configuration of the second insulating substrate in the resistive film type input device 1 of the display device 100 with the input function according to the first embodiment of the invention. In the following description, directions intersecting each other (in this embodiment, the directions perpendicular to each other) on the surfaces of the first insulating substrate and the second insulating substrate used in the resistive film type input device are referred to as X and Y directions, respectively. In (a) and (b) of FIG. 2, detecting electrode films are shown by decreasing the number thereof.

In the resistive film type input panel 2 used in the resistive film type input device 1 according to this embodiment, a planar resistive film 11 having a light-transmitting property and formed of an ITO (Indium Tin Oxide) film is formed across an input area 2a of the first surface 10a of the first insulating substrate 10, as show in (a) of FIG. 2. In addition, the first surface 10a of the first insulating substrate 10 is provided with a pair of first feeding electrodes 12a and 12b which are electrically connected in the Y direction to both the substantially entire end portions of the planar resistive film 11 opposed to each other in the X direction are formed and a pair of second feeding electrodes 12c and 12d which are electrically connected in the X direction to both the substantially entire end portions of the planar resistive film 11 opposed to each other in the Y direction. The first feeding electrodes 12a and 12b and the second feeding electrodes 12c and 12d are metal electrodes laminated on the end portions of the planar resistive film 11 and formed of silver, silver alloy, or the like. The sheet resistance of the first feeding electrodes 12a and 12b and the second feeding electrodes 12c and 12d is about 0.2 $\Omega$/sq, for example. However, the resistance of the planar resistive film 11 is about 500 $\Omega$/sq, for example. Accordingly, the sheet resistance of the first feeding electrodes 12a and 12b and the second feeding electrodes 12c and 12d is considerably lower than that of the planar resistive film 11.

As shown in (b) of FIG. 2, a plurality of detecting electrode films 21a, 21b, . . . , and 21l in an electrically floating state are formed in an area where the first surface 20a of the second insulating substrate 20 overlaps with the planar resistive film 11 formed on the first insulating substrate 10 in plan view. Here, the plurality of detecting electrode films 21a, 21b, . . . , and 21l are formed such that a plurality of strip-shaped electrodes extending in the X direction are arranged in parallel at the same interval in the Y direction and the strip-shaped electrodes are partitioned into two groups in the X direction. That is, the detecting electrode films 21a, 21b, . . . , and 21l are formed such that a pair of the detecting electrode films 21a and 21l extend in the X direction, a pair of the detecting electrode films 21b and 21k extend in the X direction, a pair of the detecting electrode films 21c and 21j extend in the X direction, a pair of the detecting electrode films 21d and 21i extend in the X direction, a pair of the detecting electrode films 21e and 21h extend in the X direction, and a pair of the detecting electrode films 21f and 21g extend in the X direction.

When the strip-shaped electrodes extending in the X direction are partitioned in the X direction, the strip-shaped electrodes are partitioned by slits 21s extending in a direction intersecting both the X and Y directions. With such a configuration, the plurality of detecting electrode films 21a, 21b, . . . , and 21l all have a planar right-angled triangle and the detecting electrode films adjacent to each other in the X direction are adjacent such that the hypotenuses thereof are opposed to each other.

The detecting electrode films 21a, 21b, . . . , and 21l having such a configuration are formed of a light-transmitting film such as an ITO film, like the planar resistive film 11 formed on the first insulating substrate 10. However, the detecting electrode films 21a, 21b, . . . , and 21l are not required to have a sheet resistance as large as that of the planar resistive film 11 formed on the first insulating substrate 10. Accordingly, the detecting electrode films 21a, 21b, . . . , and 21l are formed of the ITO film having a sufficient film thickness.

On the first surface 20a of the second insulating substrate 20, wirings 22a, 22b, . . . , and 22l electrically connected to the ends (portions corresponding to the bottom sides of the triangles) of the detecting electrode films 21a, 21b, . . . , and 21l, respectively. Moreover, terminals 23a, 23b, . . . , and 23l electrically connected to the detecting electrode films 21a, 21b, . . . , and 21l via the wirings 22a, 22b, . . . , and 22l, respectively, are formed.

As shown in (a) and (b) of FIG. 2, an input location detecting device 40 is provided for the resistive film type input panel 2. The input location detecting device 40 includes a feeding circuit 41 which applies a voltage to the planar resistive film 11 formed on the first insulating substrate 10 and a signal detecting circuit 45 which detects signals from the detecting electrode films 21a, 21b, . . . , and 21l formed on the second insulating substrate 20. The input location detecting device 40 further includes a control unit 48. The control unit 48 controls a switching operation of the feeding circuit 41 and the signal detecting circuit 45 and processes a signal to detect a pressed location of the second insulating substrate 20 on the basis of a signal output from the signal detecting circuit 45.

In this input location detecting device 40, the feeding circuit 41 includes a constant voltage power source 42 and switches 43. Under the control of the control unit 48, the switches 43 are switched to supply a constant voltage from the constant voltage power source 42 to the first feeding electrodes 12a and 12b, as indicated by a full line in (a) of FIG. 2, and switched to supply the constant voltage from the constant voltage power source 42 to the second feeding electrodes 12c and 12d, as indicated by a dotted line in (a) of FIG. 2. Accordingly, the voltage in the X direction and the voltage in the Y direction are alternately applied to the planar resistive film 11, and thus a potential gradient toward the X direction and a potential gradient toward the Y direction are alternately generated.

In the input location detecting device 40, the signal detecting circuit 45 includes a potential detecting unit 46 and a switch 47. Under the control of the control unit 48, the switch 47 is switched to the terminals 23a, 23b, . . . , and 23l sequentially to be connected to the potential detecting unit 46. Accordingly, the potential detecting unit 46 can sequentially detect the potentials of the detecting electrode films 21a, 21b, . . . , and 21l.

One of a mechanical switch and an electric switch can be used as the switches 43 and 47 shown in (a) and (b) of FIG. 2.

Operation of Resistive Film Type Input Device 1

Figure 3:
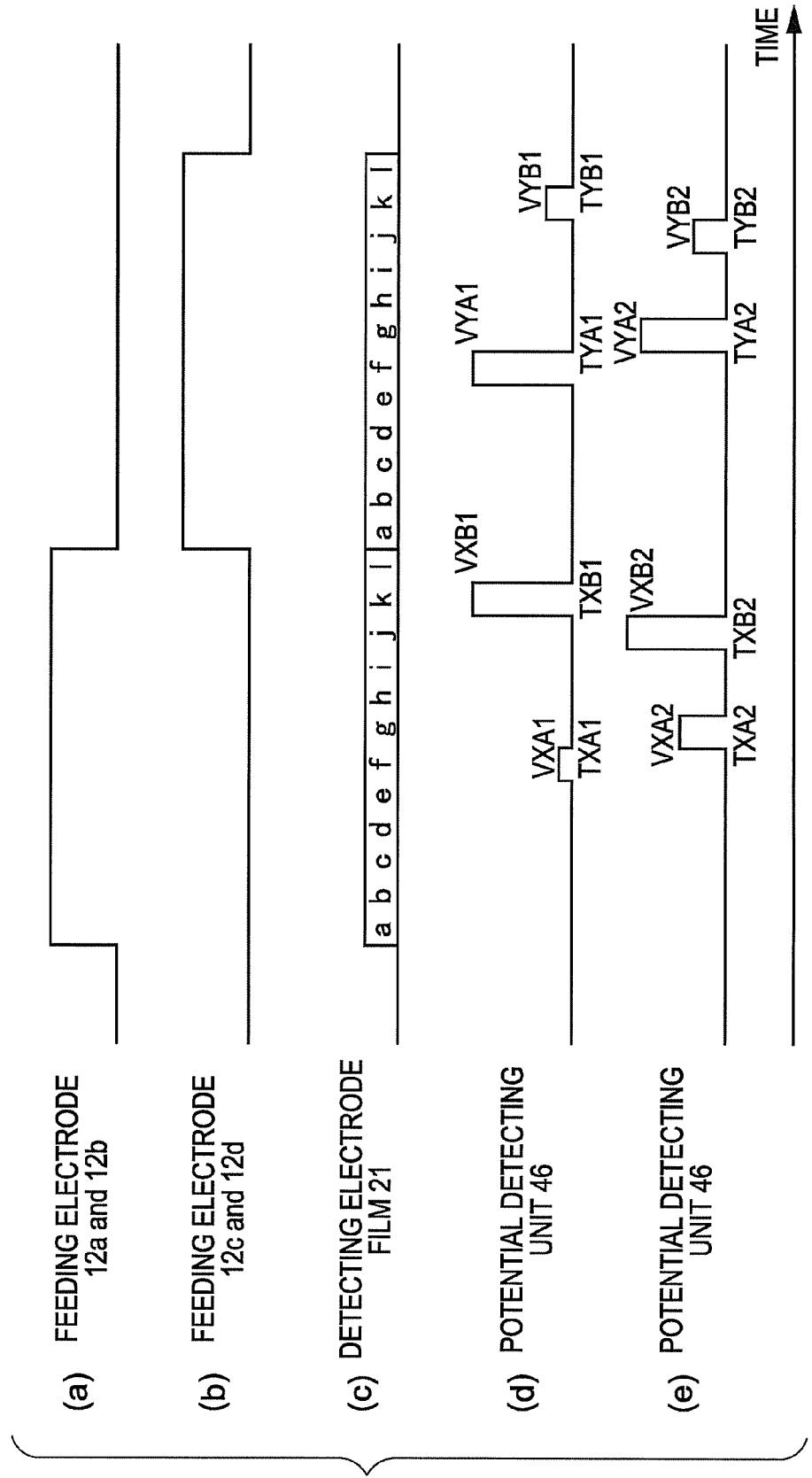
FIG. 3 is a timing chart illustrating an operation of the resistive film type input device according to the first embodiment of the invention.

FIG. 3 is a timing chart illustrating an operation of the resistive film type input device 1 according to the first embodiment of the invention.

In the first insulating substrate 10 of the resistive film type input device 1 according to this embodiment, the constant voltage supplied from the constant voltage power source 42 to the first feeding electrodes 12a and 12b and the constant voltage supplied from the constant voltage power source 42 to the second feeding electrodes 12c and 12d are switched in time-series, as shown in (a) and (b) of FIG. 3. Accordingly, the voltage in the X direction and the voltage in the Y direction are alternately applied to the planar resistive film 11 and the potential gradient toward the X direction and the potential gradient toward the Y direction are alternately generated.

As shown in (c) of FIG. 3, the terminals 23a, 23b, . . . , and 23l connected to the potential detecting unit 46 are sequentially switched in time-series, while the voltage in the X direction is applied to the planar resistive film 11. Moreover, the terminals 23a, 23b, . . . , and 23l connected to the potential detecting unit 46 are sequentially switched, while the voltage in the Y direction is applied to the planar resistive film 11.

When a location PA1 is pressed down by a pen or a finger and thus the planar resistive film 11 and the detecting electrode film 21f come in contact with each other in the second insulating substrate 20, as shown in (a) and (b) of FIG. 2, the potential detecting unit 46 detects a potential VXA1 of the location PA1 of the planar resistive film 11 at time TXA1, as show in (d) of FIG. 3. Then, based on the level of the potential VXA1, the control unit 48 detects the position (X coordinate) of the location PA1 in the X direction where the second insulating substrate 20 is pressed down. In addition, the potential detecting unit 46 detects a potential VYA1 of the location PA1 of the planar resistive film 11 at time TYA1. Based on the level of the potential VYA1, the control unit 48 detects the position (Y coordinate) of the location PA1 in the Y direction where the second insulating substrate 20 is pressed down.

Here, it is assumed that when the location PA1 of the second insulating substrate 20 is pressed down, a location PB1 of the second insulating substrate 20 is simultaneously pressed down by the pen or the finger and the planar resistive film 11 and the detecting electrode film 21k contact to each other. In this case, since the potential detecting unit 46 detects a potential VXB1 of the location PB1 of the planar resistive film 11 at time TXB1, the control unit 48 can detect the position (X coordinate) of the location PB1 in the X direction where the second insulating substrate 20 is pressed down, based on the level of the potential VXB1. Since the potential detecting unit 46 detects a potential VYB1 of the location PB1 of the planar resistive film 11 at time TYB1, the control unit 48 can detect the position (Y coordinate) of the location PB1 in the Y direction where the second insulating substrate 20 is pressed down, based on the level of the potential VYB1. Accordingly, even when the second insulating substrate 20 is pressed down simultaneously at two locations, it is possible to detect the pressed respective locations.

It is assumed that the pen or the finger pressing down the position PA1 moves to a location PA2 in the second insulating substrate 20 and the planar resistive film 11 and the detecting electrode film 21g come in contact with each other, as shown in (a) and (b) of FIG. 2. It is assumed that the pen or the finger pressing down the location PB1 simultaneously moves to a location PB2 and the planar resistive film 11 and the detecting electrode film 21j contact to each other. In this case, as shown in (e) of FIG. 3, the potential detecting unit 46 detects a potential VXA2 of the location PA2 of the planar resistive film 11 at time TXA2. Based on the level of the potential VXA2, the control unit 48 detects a position (X coordinate) of the location PA2 in the X direction where the second insulating substrate 20 is pressed down. In addition, the potential detecting unit 46 detects a potential VYA2 of the location PA2 of the planar resistive film 11 at time TYA2. Based on the level of the potential VYA2, the control unit 48 detects a position (Y coordinate) of the location PA2 in the Y direction where the second insulating substrate 20 is pressed down.

The potential detecting unit 46 detects a potential VXB2 of the location PB2 of the planar resistive film 11 at time TXB2. Based on the level of the potential VXB2, the control unit 48 detects a position (X coordinate) of the location PB2 in the X direction where the second insulating substrate 20 is pressed down. In addition, the potential detecting unit 46 detects a potential VYB2 of the location PB2 of the planar resistive film 11 at time TYB2. Based on the level of the potential VYB2, the control unit 48 detects a position (Y coordinate) of the location PB2 in the Y direction where the second insulating substrate 20 is pressed down.

Main Advantages of Embodiment

As described above, in the resistive film type input device 1 according to this embodiment, the planar resistive film 11 is formed on the first insulating substrate 10, and the potential gradients are generated in the planar resistive film 11 by applying the voltage to both the end portions of the planar resistive films 11 via the first feeding electrodes 12a and 12b and the second feeding electrodes 12c and 12d formed on the first insulating substrate 10. On the other hand, the plurality of detecting electrode films 21a, 21b, . . . , and 21l in the floating state are formed on the second insulating substrate 20. The potential detecting unit 46 detects the potentials of the plurality of detecting electrode films 21a, 21b, . . . , and 21l. With such a configuration, when one of the plurality of detecting electrode films 21a, 21b, . . . , and 21l contacts to the planar resistive film 11 by pressing down the second insulating substrate 20, the potential detecting unit 46 can detect the potential of the contact location of the planar resistive film 11 through the detecting electrode film contacting to the planar resistive film 11 among the detecting electrode films 21a, 21b, . . . , and 21l. Accordingly, it is possible to specify the location where the second insulating substrate 20 is pressed down.

Here, the plurality of detecting electrode films 21a, 21b, . . . , and 21l are formed. With such a configuration, even when the second insulating substrate 20 is pressed down at a plurality of locations, the potential detecting unit 46 can specify the plurality of simultaneously pressed locations as long as the pressed locations are different locations corresponding to the detecting electrode films 21a, 21b, . . . , and 21l. Accordingly, the resistive film type input device 1 according to this embodiment is a touch panel capable of carrying out an input operation by either the pen or the finger and can detect the plurality of simultaneously pressed locations.

In this embodiment, since the potential gradient is generated in the resistive film on the side of the first insulating substrate 10, it is necessary to form the planar resistive film 11 on the first insulating substrate 10. However, the sheet resistance of the detecting electrode films 21a, 21b, . . . , and 21l formed on the second insulating substrate 20 is not required to be high. Therefore, since the resistive film in which resistance deviation easily occurs may be formed only on the first insulating substrate 10, a detection error caused due to the resistance deviation of the resistive film rarely occurs. Accordingly, it is possible to surely specify the plurality of simultaneously pressed locations.

In this embodiment, the planar resistive film 11 extending the X and Y directions is formed on the first insulating substrate 10. With such a configuration, by applying the voltage to be applied to the first feeding electrodes 12a and 12b and the voltage to be applied to the second feeding electrodes 12c and 12d at different times, it is possible to specify the positions of the plurality of simultaneously pressed locations in the X and Y directions.

The plurality of detecting electrode films 21a, 21b, . . . , and 21l are formed such that the strip-shaped electrode films extending in the X direction are partitioned into two groups in the X direction. With such a configuration, even when two locations at the same position in the Y direction are pressed down simultaneously, it is possible to specify the respective positions of the pressed locations in the X and Y directions. Moreover, the detecting electrode films 21a, 21b, . . . , and 21l are partitioned into the two groups in the X direction by the slits 21s extending in the direction intersecting both the X and Y directions. With such a configuration, even when locations slightly different in the Y direction are pressed down, the different detecting electrode films 21a, 21b, . . . , and 21l can be easily pressed down. Accordingly, even when two locations slightly different in the Y direction are pressed down, it is possible to specify the positions of a plurality of occasionally pressed locations in the X and Y directions.

Second Embodiment

Figure 4:
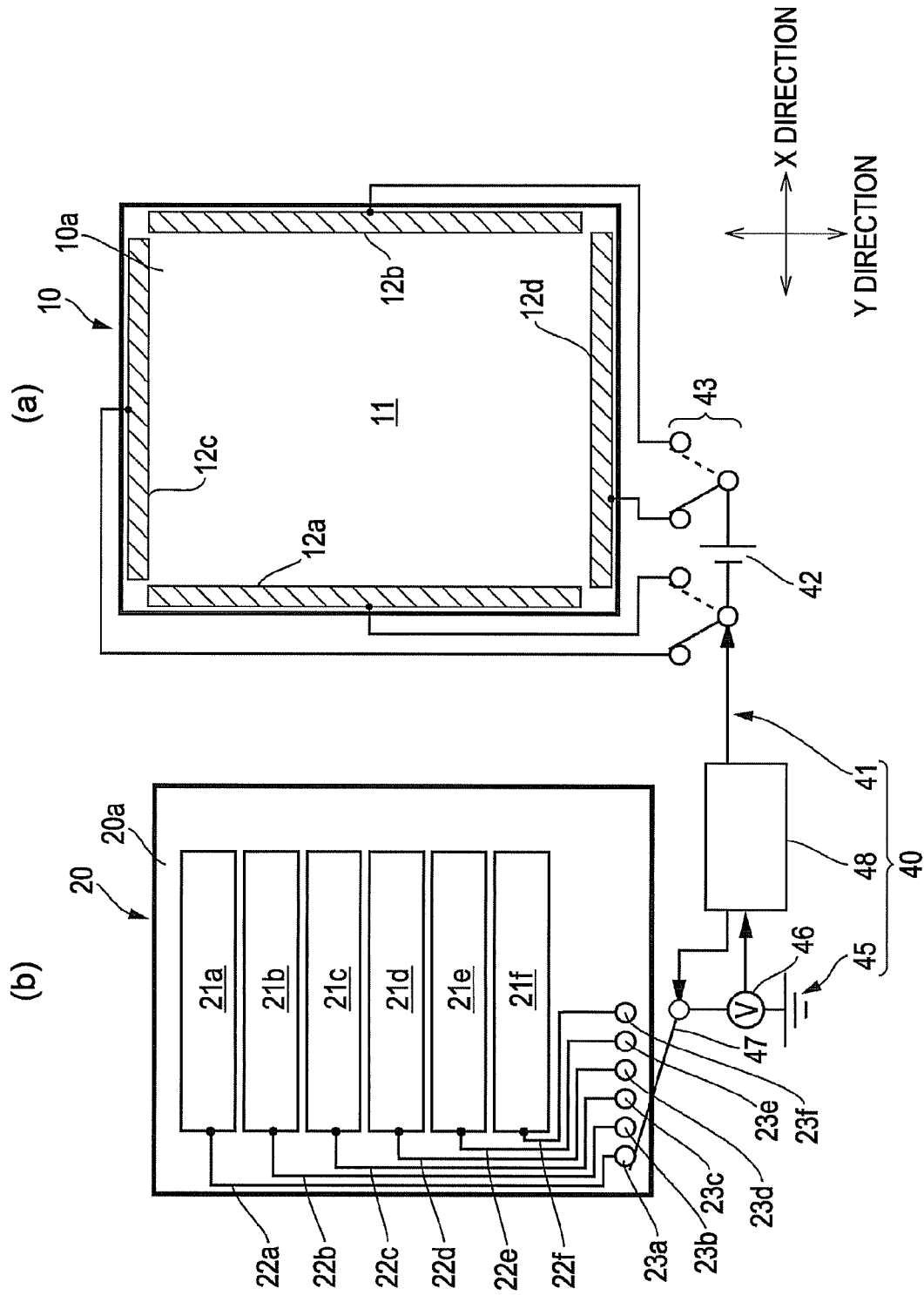
FIG. 4 is an explanatory diagram schematically illustrating the configuration of a first insulating substrate and the configuration of a second insulating substrate in a resistive film type input device of the display device with the input function according to a second embodiment of the invention.

FIG. 4 is an explanatory diagram schematically illustrating the configuration of a first insulating substrate and the configuration of a second insulating substrate in a resistive film type input device of the display device with the input function according to a second embodiment of the invention. In addition, since the basic configuration of this embodiment is the same as that of the first embodiment, the same reference numerals are given to the same constituent elements, the description is omitted.

As shown in (a) of FIG. 4, in the resistive film type input panel of the display device with the input function according to this embodiment, a planar resistive film 11 having a light-transmitting property and formed of an ITO film is also formed on the first surface 10a of the first insulating substrate 10, like the first embodiment. In addition, on the first surface 10a of the first insulating substrate 10, a pair of first feeding electrodes 12a and 12b which are electrically connected in the Y direction to both the substantially entire end portions of the planar resistive film 11 opposed to each other in the X direction are formed, and a pair of second feeding electrodes 12c and 12d which are electrically connected in the X direction to both the substantially entire end portions of the planar resistive film 11 opposed to each other in the Y direction.

As shown in (b) of FIG. 4, a plurality of detecting electrode films 21a, 21b, . . . , and 21f in an electrically floating state are formed in an area where the first surface 20a of the second insulating substrate 20 overlaps with the planar resistive film 11 formed on the first insulating substrate 10 in plan view.

Here, the plurality of detecting electrode films 21a, 21b, . . . , and 21f are formed such that a plurality of strip-shaped electrodes having the same size and extending in the X direction are arranged in parallel at the same interval in the Y direction. The detecting electrode films 21a, 21b, . . . , and 21f are also formed of a light-transmitting film such as an ITO film, like the planar resistive film 11 formed on the first insulating substrate 10. However, the detecting electrode films 21a, 21b, . . . , and 21f are not required to have a sheet resistance as large as that of the planar resistive film 11 formed on the first insulating substrate 10. Accordingly, the detecting electrode films 21a, 21b, . . . , and 21f are formed of the ITO film having a sufficient film thickness.

As shown in (a) and (b) of FIG. 4, an input location detecting device 40 is also provided for the resistive film type input panel 2 according to this embodiment, like the first embodiment. The input location detecting device 40 includes a feeding circuit 41 which applies a voltage to the planar resistive film 11 formed on the first insulating substrate 10 and a signal detecting circuit 45 which detects signals from the detecting electrode films 21a, 21b, . . . , and 21f formed on the second insulating substrate 20. The input location detecting device 40 further includes a control unit 48. The control unit 48 controls a switching operation of the feeding circuit 41 and the signal detecting circuit 45 and detects a pressed location of the second insulating substrate 20 on the basis of a signal output from the signal detecting circuit 45. Since the other configuration is the same as that of the first embodiment, the description is omitted.

In the resistive film type input device having such a configuration, the voltage in the X direction and the voltage in the Y direction are alternately applied to the planar resistive film 11, and thus a potential gradient toward the X direction and a potential gradient toward the Y direction are alternately generated, like the first embodiment. In addition, the terminals 23a, 23b, . . . , and 23f connected to the potential detecting unit 46 are sequentially switched, while the voltage in the X direction is applied to the planar resistive film 11. Moreover, the terminals 23a, 23b, . . . , and 23f connected to the potential detecting unit 46 are sequentially switched, while the voltage in the Y direction is applied to the planar resistive film 11. With such a configuration, when the second insulating substrate 20 is pressed down and thus one of the detecting electrode films 21a, 21b, . . . , and 21f contacts to the planar resistive film 11, as described with reference to FIG. 3, the potential detecting unit 46 can detect the potential of the planar resistive film 11 at the contact location through the detecting electrode film contacting to the planar resistive film 11 among the detecting electrode films 21a, 21b, . . . , and 21f. According to this embodiment, even when the second insulating substrate 20 is pressed down at a plurality of locations, the potential detecting unit 46 can specify the plurality of simultaneously pressed locations as long as the pressed locations are different locations corresponding to the detecting electrode films 21a, 21b, . . . , and 21f.

Third Embodiment

Figure 5:
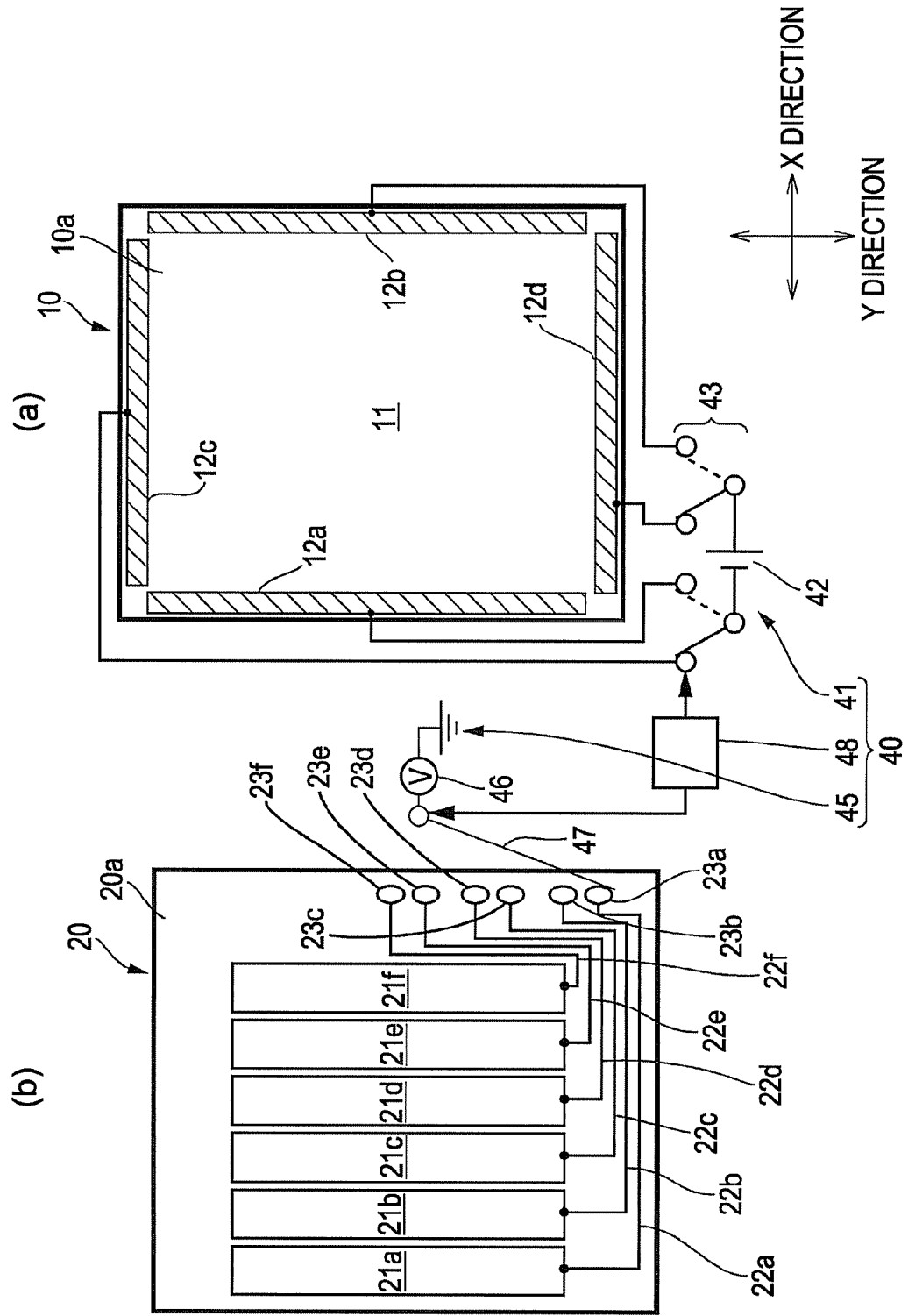
FIG. 5 is an explanatory diagram schematically illustrating the configuration of a first insulating substrate and the configuration of a second insulating substrate in a resistive film type input device of the display device with the input function according to a third embodiment of the invention.

FIG. 5 is an explanatory diagram schematically illustrating the configuration of a first insulating substrate and the configuration of a second insulating substrate in a resistive film type input device of the display device with the input function according to a third embodiment of the invention. In addition, since the basic configuration of this embodiment is the same as that of the first and second embodiments, the same reference numerals are given to the same constituent elements, the description is omitted.

As shown in (a) of FIG. 5, in the resistive film type input panel of the display device with the input function according to this embodiment, a planar resistive film 11 having a light-transmitting property and formed of an ITO film is also formed on the first surface 10a of the first insulating substrate 10, like the first and second embodiments. In addition, the first surface 10a of the first insulating substrate 10 is provided with a pair of first feeding electrodes 12a and 12b (first feeding electrodes) which are electrically connected in the Y direction to both the substantially entire end portions of the planar resistive film 11 opposed to each other in the X direction are formed and a pair of second feeding electrodes 12c and 12d (second feeding electrodes) which are electrically connected in the X direction to both the substantially entire end portions of the planar resistive film 11 opposed to each other in the Y direction.

As shown in (b) of FIG. 5, a plurality of detecting electrode films 21a, 21b, . . . , and 21f in an electrically floating state are formed in an area where the first surface 20a of the second insulating substrate 20 overlaps with the planar resistive film 11 formed on the first insulating substrate 10 in plan view.

Here, the plurality of detecting electrode films 21a, 21b, . . . , and 21f are formed such that a plurality of strip-shaped electrodes having the same size and extending in the Y direction are arranged in parallel at the same interval in the X direction. The detecting electrode films 21a, 21b, . . . , and 21f are also formed of a light-transmitting film such as an ITO film, like the planar resistive film 11 formed on the first insulating substrate 10. However, the detecting electrode films 21a, 21b, . . . , and 21f are not required to have a sheet resistance as large as that of the planar resistive film 11 formed on the first insulating substrate 10. Accordingly, the detecting electrode films 21a, 21b, . . . , and 21f are formed of the ITO film having a sufficient film thickness.

As shown in (a) and (b) of FIG. 5, an input location detecting device 40 is provided for the resistive film type input panel 2, like the first and second embodiments. The input location detecting device 40 includes a feeding circuit 41 which applies a voltage to the planar resistive film 11 formed on the first insulating substrate 10 and a signal detecting circuit 45 which detects signals from the detecting electrode films 21a, 21b, ..., and 21f formed on the second insulating substrate 20. The input location detecting device 40 further includes a control unit 48. The control unit 48 controls a switching operation of the feeding circuit 41 and the signal detecting circuit 45 and detects a pressed location of the second insulating substrate 20 on the basis of a signal output from the signal detecting circuit 45. Since the other configuration is the same as that of the first and second embodiments, the description is omitted.

In the resistive film type input device having such a configuration, the voltage in the X direction and the voltage in the Y direction are alternately applied to the planar resistive film 11, and thus a potential gradient toward the X direction and a potential gradient toward the Y direction are alternately generated, like the first and second embodiments. In addition, the terminals 23a, 23b, ..., and 23f connected to the potential detecting unit 46 are sequentially switched, while the voltage in the X direction is applied to the planar resistive film 11. Moreover, the terminals 23a, 23b, ..., and 23f connected to the potential detecting unit 46 are sequentially switched, while the voltage in the Y direction is applied to the planar resistive film 11. With such a configuration, when the second insulating substrate 20 is pressed down and thus one of the detecting electrode films 21a, 21b, ..., and 21f contacts to the planar resistive film 11, as described with reference to FIG. 3, the potential detecting unit 46 can detect the potential of the planar resistive film 11 at the contact location through the detecting electrode film contacting to the planar resistive film 11 among the detecting electrode films 21a, 21b, ..., and 21f. According to this embodiment, even when the second insulating substrate 20 is pressed down at a plurality of locations, the potential detecting unit 46 can specify the plurality of simultaneously pressed locations as long as the pressed locations are different locations corresponding to the detecting electrode films 21a, 21b, ..., and 21f.

Fourth Embodiment

Figure 6:
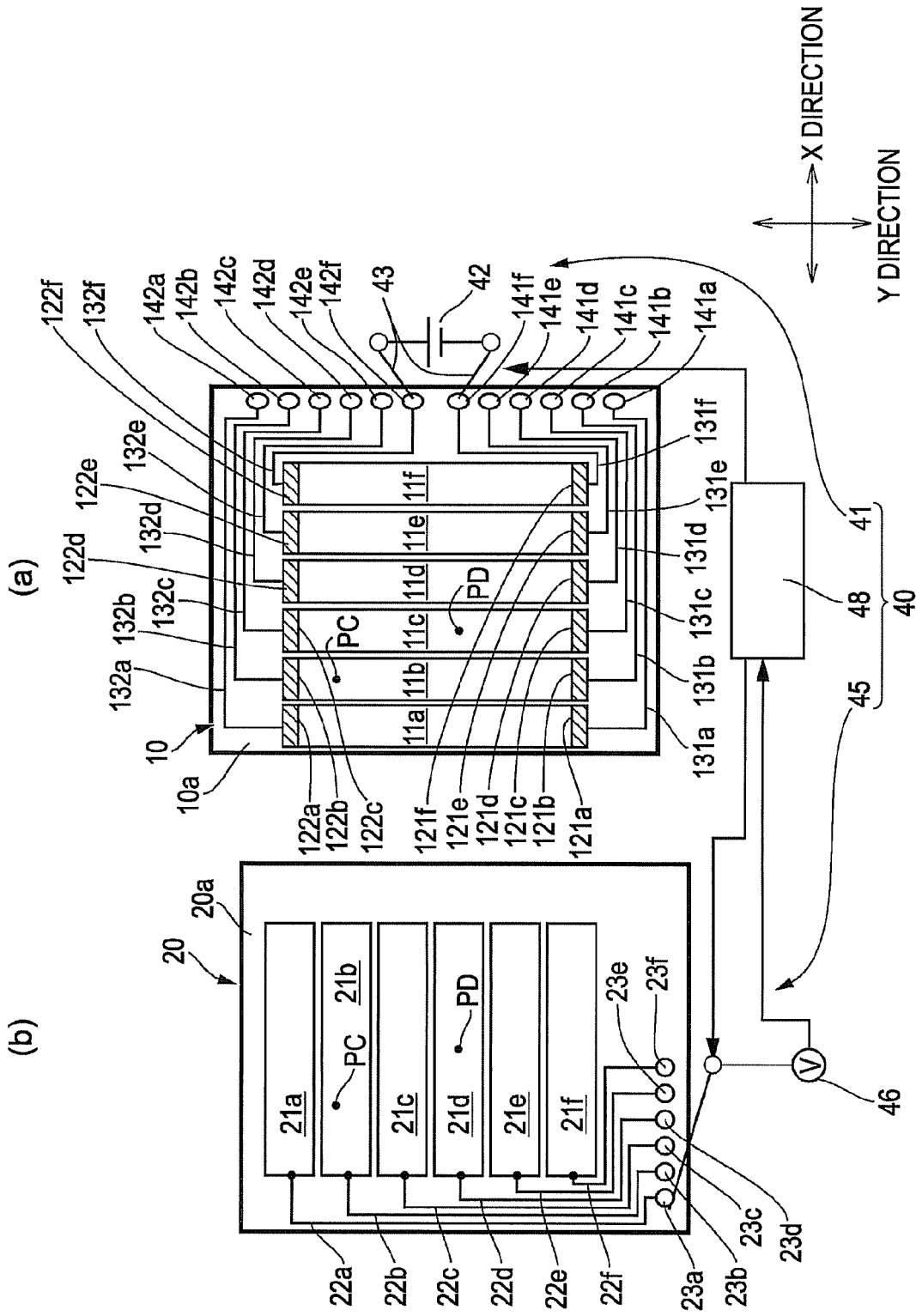
FIG. 6 is an explanatory diagram schematically illustrating the configuration of a first insulating substrate and the configuration of a second insulating substrate in a resistive film type input device of the display device with the input function according to a fourth embodiment of the invention.

FIG. 6 is an explanatory diagram schematically illustrating the configuration of a first insulating substrate and the configuration of a second insulating substrate in a resistive film type input device of the display device with the input function according to a fourth embodiment of the invention. In addition, since the basic configuration of this embodiment is the same as that of the first to third embodiments, the same reference numerals are given to the same constituent elements, the description is omitted.

As shown in (a) of FIG. 6, in the resistive film type input panel of the display device with the input function according to this embodiment, a resistive film is formed on the first surface 10a of the first insulating substrate 10, like the first and second embodiments. However, unlike the planar resistive film, in this embodiment, there are provided a plurality of strip-shaped resistive films 11a, 11b, ..., and 11f having the same size and extending in the Y direction. The strip-shaped resistive films 11a, 11b, ..., and 11f are arranged in parallel at the same interval in the X direction.

On the first surface 10a of the first insulating substrate 10, first feeding electrodes 121a, 121b, ..., and 121f are connected to one ends of the plurality of strip-shaped resistive films 11a, 11b, ..., and 11f in the Y direction, and second feeding electrodes 122a, 122b, ..., and 122f are connected to the other ends of the plurality of strip-shaped resistive films 11a, 11b, ..., and 11f in the Y direction.

On the first surface 10a of the first insulating substrate 10, wirings 131a, 131b, ..., and 131f are connected to the first feeding electrodes 121a, 121b, ..., and 121f, respectively, and wirings 132a, 132b, ..., and 132f are connected to the second feeding electrodes 122a, 122b, ..., and 122f, respectively. Terminals 141a, 141b, ..., and 141f are formed in the ends of the wirings 131a, 131b, ..., and 131f, respectively. In addition, terminals 142a, 142b, and 142f are formed in the ends of the wirings 132a, 132b, ..., and 132f, respectively.

In this embodiment, the plurality of strip-shaped resistive films 11a, 11b, ..., and 11f are all formed of a thin ITO film. The first feeding electrodes 121a, 121b, ..., and 121f and the second feeding electrodes 122a, 122b, ..., and 122f are formed of silver or silver alloy.

As shown in (b) of FIG. 6, on the first surface 20a of the second insulating substrate 20, a plurality of detecting electrode films 21a, 21b, ..., and 21f in the electrically floating state are formed in an area overlapping in plan view with the area where the strip-shaped resistive films 11a, 11b, ..., and 11f are arranged on the first insulating substrate 10. Here, the plurality of detecting electrode films 21a, 21b, ..., and 21f are formed such that a plurality of strip-shaped electrodes extending in the X direction are arranged in parallel at the same interval in the Y direction. The detecting electrode films 21a, 21b, ..., and 21f are also formed of a light-transmitting film such as an ITO film, like the strip-shaped resistive films 11a, 11b, ..., and 11f formed on the first insulating substrate 10. However, the detecting electrode films 21a, 21b, ..., and 21f are not required to have a sheet resistance as large as that of the planar resistive film 11 formed on the first insulating substrate 10. Accordingly, the detecting electrode films 21a, 21b, ..., and 21f are formed of the ITO film having a sufficient film thickness. In addition, the first surface 20a of the second insulating substrate 20 is provided with wirings 22a, 22b, ..., and 22f electrically connected to the ends of the detecting electrode films 21a, 21b, ..., and 21f, respectively, and terminals 23a, 23b, ..., and 23f electrically connected to the detecting electrode films 21a, 21b, ..., 21f via the wirings 22a, 22b, ..., and 22f, respectively.

As shown in (a) and (b) of FIG. 6, an input location detecting device 40 is provided for the resistive film type input panel. The input location detecting device 40 includes a feeding circuit 41 which sequentially applies a voltage to the plurality of strip-shaped resistive films 11a, 11b, ..., and 11f formed on the first insulating substrate 10 and a signal detecting circuit 45 which detects signals from the detecting electrode films 21a, 21b, ..., and 21f formed on the second insulating substrate 20. The input location detecting device 40 further includes a control unit 48. The control unit 48 controls a switching operation of the feeding circuit 41 and the signal detecting circuit 45 and detects a pressed location of the second insulating substrate 20 on the basis of a signal output from the signal detecting circuit 45.

Operation of Resistive Film Type Input Device 1

FIG. 7 is a timing chart illustrating an operation of the resistive film type input device 1 according to the fourth embodiment of the invention.

As shown in (a) to (f) of FIG. 7, in the first insulating substrate 10 of the resistive film type input device 1 according to this embodiment, a voltage is sequentially applied to the plurality of strip-shaped resistive films 11a, 11b, ..., and 11f in time-series. As shown in (g) of FIG. 7, the terminals 23a, 23b, ..., and 23f connected to the potential detecting unit 46 are sequentially switched in time-series, while the voltage is applied to the plurality of strip-shaped resistive films 11a, 11b, ..., and 11f.

When a location PC is pressed down and thus the strip-shaped resistive film 11*b* and the detecting electrode film 21*b* come in contact with each other in the second insulating substrate 20, as shown in (a) and (b) of FIG. 6, the potential detecting unit 46 detects a potential VC of the location PC of the strip-shaped resistive film 11*b* at time TC, as show in (h) of FIG. 7. Then, based on the level of the potential VC, the control unit 48 detects the position (Y coordinate) of the location PC in the Y direction where the second insulating substrate 20 is pressed down. In addition, the control unit 48 determines whether the time of detecting the potential is the time of applying the voltage to one of the plurality of strip-shaped resistive films 11*a*, 11*b*, . . . , and 11*f*, and then detects the position (X coordinate) of the location PC in the X direction where the second insulating substrate 20 is pressed down on the basis of the determination result.

Here, it is assumed that when the location PC of the second insulating substrate 20 is pressed down, a location PD of the second insulating substrate 20 is simultaneously pressed down and the strip-shaped resistive film 11*c* and the detecting electrode film 21*d* contact to each other. In this case, the potential detecting unit 46 detects a potential VD of the location PD of the strip-shaped resistive film 11*c* at time TD. Moreover, the control unit 48 can detect the position (Y coordinate) of the PD in the Y direction where the second insulating substrate 20 is pressed down, based on the level of the potential VD. The control unit 48 determines whether the time of detecting the potential is the time of applying the voltage to one of the plurality of strip-shaped resistive films 11*a*, 11*b*, . . . , and 11*f*, and then detects the position (X coordinate) of the location PD in the X direction where the second insulating substrate 20 is pressed down on the basis of the determination result.

Main Advantages of Embodiment

As described above, in the resistive film type input device 1 according to this embodiment, the strip-shaped resistive films 11*a*, 11*b*, . . . , and 11*f* are formed on the first insulating substrate 10, and the potential gradients are generated in the strip-shaped resistive films 11*a*, 11*b*, . . . , and 11*f* by applying the voltage to both the end portions of the strip-shaped resistive films 11*a*, 11*b*, . . . , and 11*f* via the first feeding electrodes 121*a*, 121*b*, . . . , and 121*f* and the second feeding electrodes 122*a*, 122*b*, . . . , and 122*f* formed on the first insulating substrate 10. On the other hand, the plurality of detecting electrode films 21*a*, 21*b*, . . . , and 21*f* in the floating state are formed on the second insulating substrate 20. The potential detecting unit 46 detects the potentials of the plurality of detecting electrode films 21*a*, 21*b*, . . . , and 21*f*. With such a configuration, when one of the plurality of detecting electrode films 21*a*, 21*b*, . . . , and 21*f* contacts to one of the strip-shaped resistive films 11*a*, 11*b*, . . . , and 11*f* by pressing down the second insulating substrate 20, the potential detecting unit 46 can detect the potential of the contact location of the one of the strip-shaped resistive films 11*a*, 11*b*, . . . , and 11*f*. In addition, the plurality of detecting electrode films 21*a*, 21*b*, . . . , and 21*f* are provided. With such a configuration, even when the second insulating substrate 20 is pressed down at a plurality of locations, the potential detecting unit 46 can specify the plurality of simultaneously pressed locations as long as the pressed locations are different locations corresponding to the detecting electrode films 21*a*, 21*b*, . . . , and 21*f*.

In this embodiment, it is necessary to form the strip-shaped resistive films 11*a*, 11*b*, . . . , and 11*f* on the first insulating substrate 10, but the sheet resistance of the detecting electrode films 21*a*, 21*b*, . . . , and 21*f* formed on the second insulating substrate 20 is not required to be high. Therefore, since the resistive film in which resistance deviation easily occurs may be formed only on the first insulating substrate 10, a detection error caused due to the resistance deviation of the resistive film rarely occurs. Accordingly, it is possible to surely specify the plurality of simultaneously pressed locations.

In this embodiment, as described with reference to (b) of FIG. 2, the detecting electrode films 21*a*, 21*b*, . . . , and 21*f* may also be divided into two groups in the X direction.

Other Configurations

In the first to fourth embodiments described above, the output from a plurality of detecting electrode films 21*a*, 21*b*, . . . , and 21*m* to the potential detecting unit 46 is performed in time-series by the switch 47. However, the output from a plurality of detecting electrode films 21*a*, 21*b*, . . . , and 21*m* to the potential detecting unit 46 may be simultaneously performed.

In the first to fourth embodiments described above, the liquid crystal device 5 has been used as an image forming device, but an organic electro-luminescence device or a plasma display device may be used as the image forming device.

Mounted Example to Electronic Apparatus

Figure 8A:
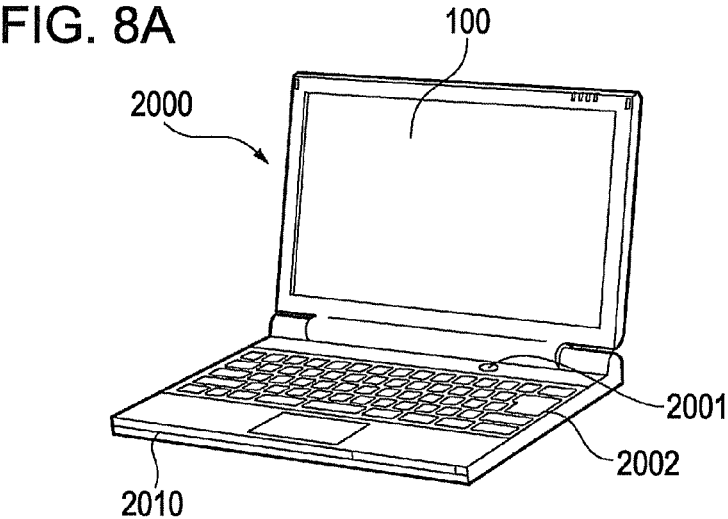
FIGS. 8A to 8C are explanatory diagrams illustrating an electronic apparatuses using the display device with the input function according to the invention.
Figure 8B:
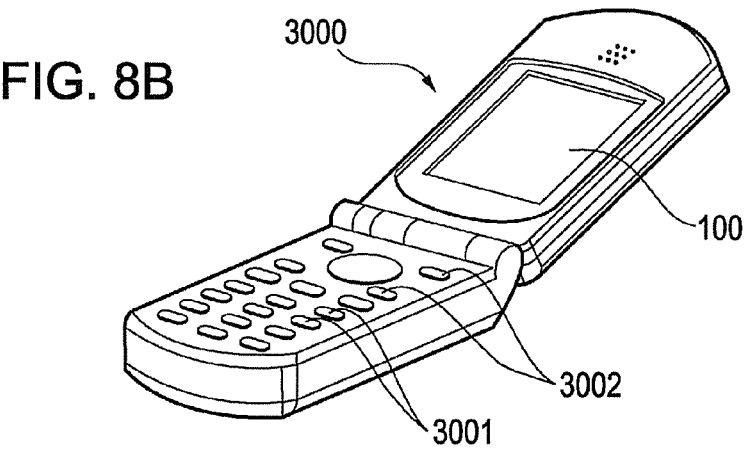
Figure 8C:
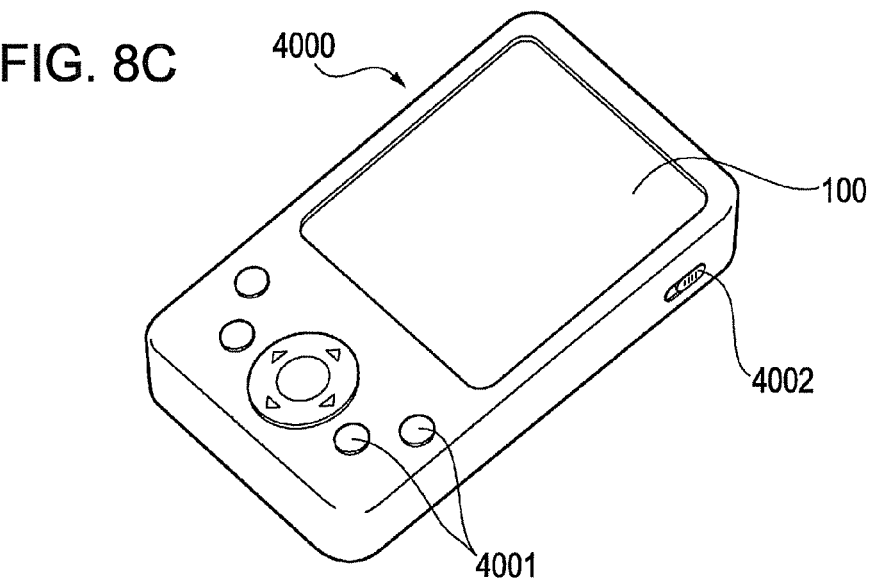
Figure 9A:
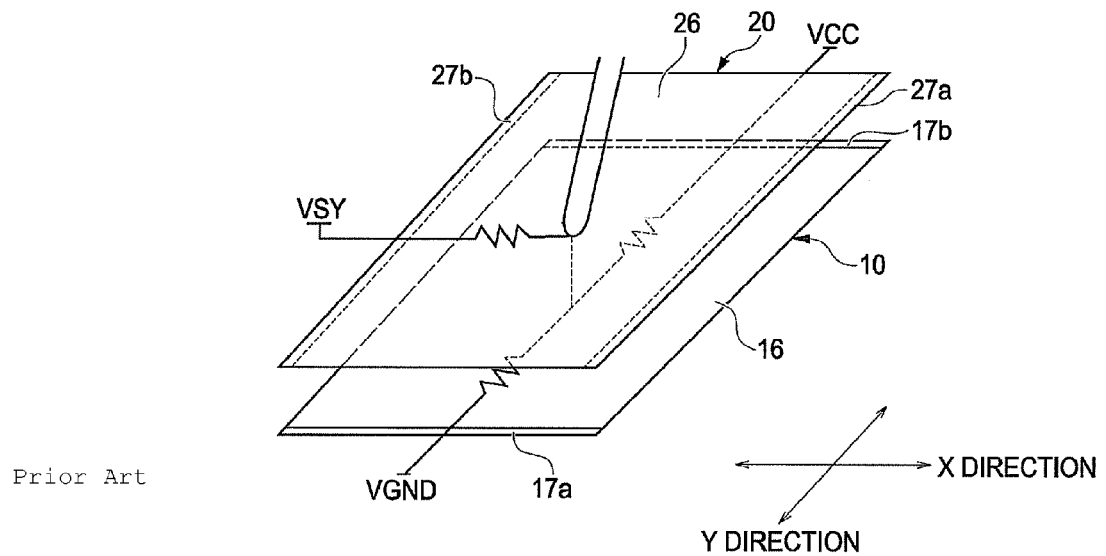
FIGS. 9A and 9B are explanatory diagrams illustrating a concept for detecting a contact location in a known resistive film type input device.
Figure 9B:
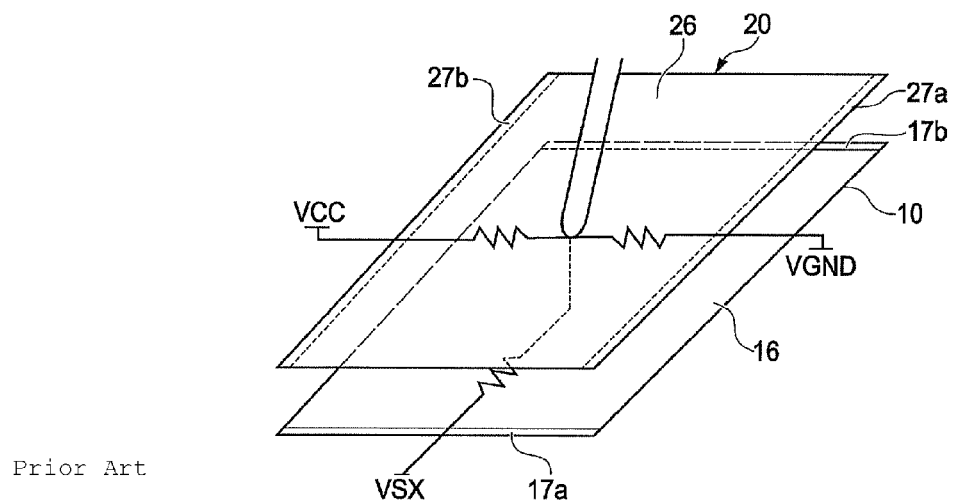

Next, an electronic apparatus to which the display device 100 with the input function according to the above-described embodiments is applied will be described. FIG. 8A shows the configuration of a portable personal computer including the display device 100 with the input function. A personal computer 2000 includes the display device 100 with the input function as a display unit and a main body 2010. The main body 2010 is provided with a power switch 2001 and a keyboard 2002. FIG. 8B shows the configuration of a cellular phone including the display device 100 with the input function. A cellular phone 3000 includes a plurality of operation buttons 3001, scroll buttons 3002, and the display device 100 with the input function as a display unit. By operating the stroll buttons 3002, a screen displayed on the display device 100 with the input function is scrolled. FIG. 8C shows the configuration of a personal digital assistant (PDA) to which the display device 100 with the input function is applied. A personal digital assistant 4000 includes a plurality of operation buttons 4001, a power switch 4002, and the display device 100 with the input function as a display unit. When the power switch 4002 is operated, various kinds of information such as an address book and a schedule book are displayed on the display device 100 with the input function.

Examples of the electronic apparatus to which the display device 100 with the input function is applied include a digital still camera, a liquid crystal TV, a view finder type or monitor direct vision-type video tape recorder, a car navigation apparatus, a pager, an electronic pocket book, a calculator, a word processor, a workstation, a television phone, a POS terminal, and a bank terminal, as well as the apparatuses shown in FIG. 8. As a display unit of these various electronic apparatuses, the above-described display device 100 with the input function can be applied.

The entire disclosure of Japanese Patent Application No. 2008-231849, filed Sep. 10, 2008 is expressly incorporated by reference herein.

What is claimed is:

1. A resistive film type input device comprising:
 a first insulating substrate disposed on a side adjacent to a liquid crystal display unit;
 a second insulating substrate which is disposed opposite the first insulating substrate with a gap interposed therebetween, the second insulating substrate disposed on a side of an input operation of the input device;

a planar resistive film which is formed on a surface of the first insulating substrate opposed to the second insulating substrate in an X direction and a Y direction intersecting the X direction on the surface of the first insulating substrate;

feeding electrodes which apply a voltage to both end portions of the resistive film on the first insulating substrate, the feeding electrodes include a first feeding electrode which applies a voltage to both end portions in the X direction of the planar resistive film and a second feeding electrode which applies a voltage to both end portions in the Y direction of the planar resistive film at time different from that of the first feeding electrode;

a plurality of detecting electrode films each having a right triangular plane shape and formed on a surface of the second insulating substrate opposed to the first insulating substrate in a manner not to contact the planar resistive film when the second insulating substrate is not pressed down, the plurality of detecting electrode films being arranged such that a plurality of pairs of the detecting electrode films are arranged in the X direction or in the Y direction with hypotenuses thereof adjacent to each other and each of the extended hypotenuses intersects both the X direction and the Y direction of the second insulating substrate, the plurality of detecting electrode films being electrically separated from each other: and a potential detecting unit for detecting potentials of the plurality of detecting electrode films respectively in a first period when the first feeding electrode applies a voltage to both end portions in the X direction of the planar resistive film, and in a second period when the second feeding electrode applies a voltage to both end portions in the Y direction of the planar resistive film, wherein the potential detecting unit is configured to upon the first period, detect a potential of a contact location of the planar resistive film through the detecting electrode film contacted to the planar resistive film among the plurality of detecting electrode films to specify a location in the X direction of the contact location, and upon the second period, detect a potential of a contact location of the planar resistive film through the detecting electrode film contacted to the planar resistive film among the plurality of detecting electrode films to specify a location in the Y direction of the contact location.

2. The resistive film type input device according to claim 1, wherein the first insulating substrate, the second insulating substrate, the planar resistive film, and the detecting electrode films all have a light-transmitting property.

3. A display device with an input function comprising: the resistive film type input device according to claim 1,
wherein the liquid crystal display unit is disposed to overlap on an opposite side of the second insulating substrate with respect to the first insulating substrate.

4. An electronic apparatus comprising the display device with the input function according to claim 3.

* * * * *